Nov. 11, 1930.    J. A. SMETHERS ET AL    1,781,670
RIDGE SPLITTER
Filed Jan. 29, 1929    3 Sheets-Sheet 1

Inventors
J. A. Smethers
Wm Elliott
by
Hubert E Pack
Attorney

Patented Nov. 11, 1930

1,781,670

UNITED STATES PATENT OFFICE

JAMES A. SMETHERS AND WILLIAM ELLIOTT, OF BEATRICE, NEBRASKA, ASSIGNORS TO DEMPSTER MILL MANUFACTURING COMPANY, OF BEATRICE, NEBRASKA, A CORPORATION OF NEBRASKA

RIDGE SPLITTER

Application filed January 29, 1929. Serial No. 335,804.

This invention relates to ridge splitters, and more particularly involves improvements relating to two row listers, whereby such implements are adapted for double listing or ridge splitting or "busting", and the objects and nature of the invention will be understood by those skilled in the art in the light of the following explanations of the accompanying drawings that show what we now believe to be the preferred mechanical expression or embodiment of our invention from among other forms, arrangements and constructions within the spirit and scope thereof.

Those skilled in the art are familiar with the operation known as "ridge splitting" or "ridge busting", and with the application of so-called ridge splitting attachments to two row lister planters to enable such planters to function as ridge splitters. However, all of the ridge splitter attachments, with which we are familiar, are of the inclined type, embodying forwardly or rearwardly and downwardly inclined supporting or drag arms or frames at the free ends of which the bell or guide wheels are mounted, and two row lister planters particularly those of the four supporting wheel type that have front and rear supporting wheels, when equipped with such attachments, are seriously objectionable and unsatisfactory in action. This difficulty is caused by the tendency of the two front frame supporting wheels to sink so deeply into the soft ground of the two adjacent ridges on which they travel, as to permit the main frame of the machine to drop at the front and tilt the plow bottoms or shovels downwardly and forwardly, thereby depressing the points thereof to such an extent that the machine approximately "rides on the plow points", approximately taking the weight from the rear supporting wheels, and permitting them to shift or slew laterally with a constant tendency to throw the machine out of line and from the ridges.

It is the object of our invention to provide a ridge splitter that will so cooperate with the two row lister equipped therewith as to aid in upholding the front of the main frame and in reducing to the minimum any tendency of the machine to swing laterally from the desired line of travel and to thereby reduce the hereinbefore mentioned difficulties to the minimum.

With the foregoing and other objects in view, our invention consists in certain novel features in construction, combination and/or arrangement, as more fully described and specified hereinafter.

Referring to the accompanying drawings, forming part hereof:—

Figure 1:
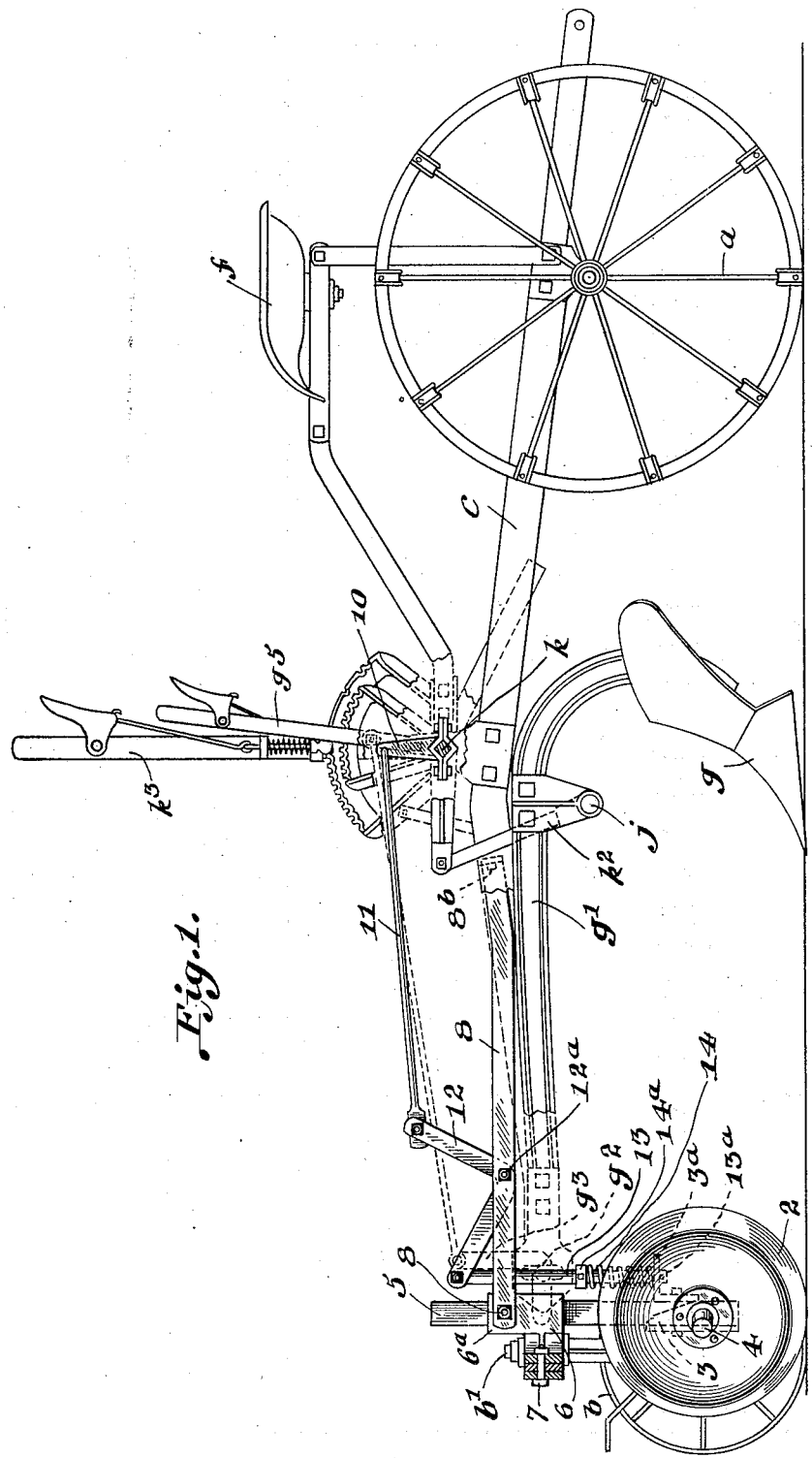
Fig. 1 is a side elevation of a two row lister planter equipped in accordance with our invention for ridge splitting, the front portion of the frame being broken away and one of the front supporting wheels not being shown, certain other parts of the planter being broken away and shown by dotted lines.
Figure 2:
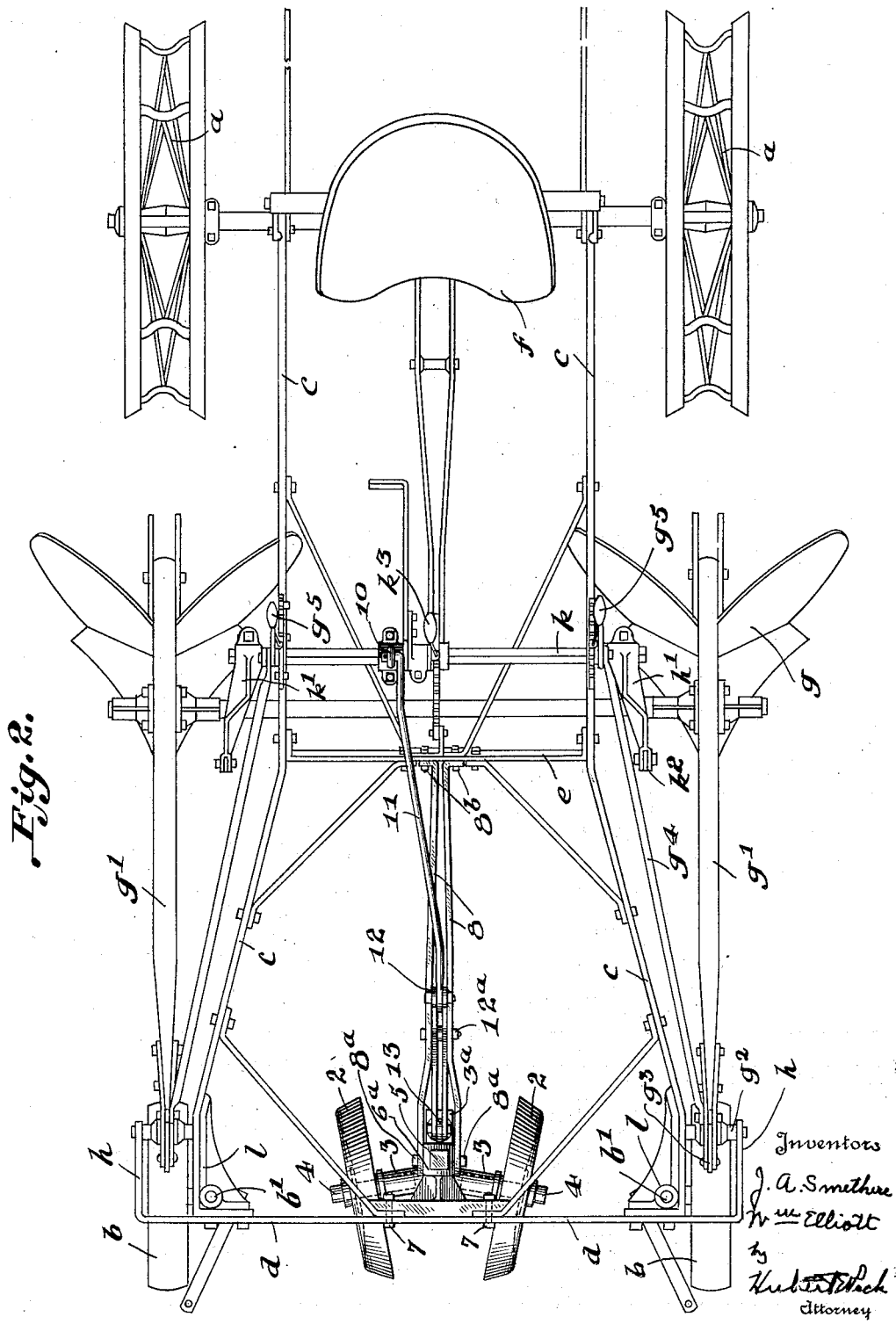
Fig. 2 shows the planter and attachment of Fig. 1, in top plan.
Figure 3:
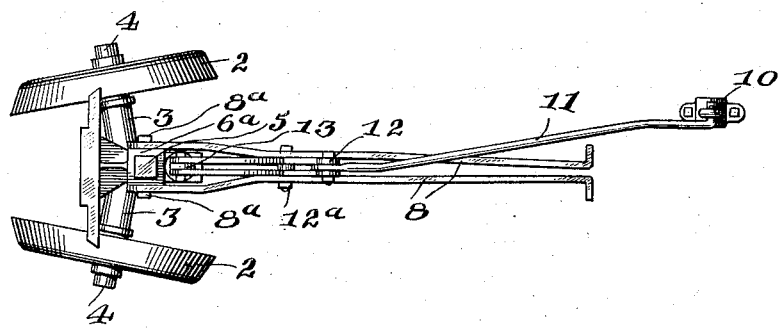
Fig. 3 is a detached top plan of the attachment.
Figure 4:
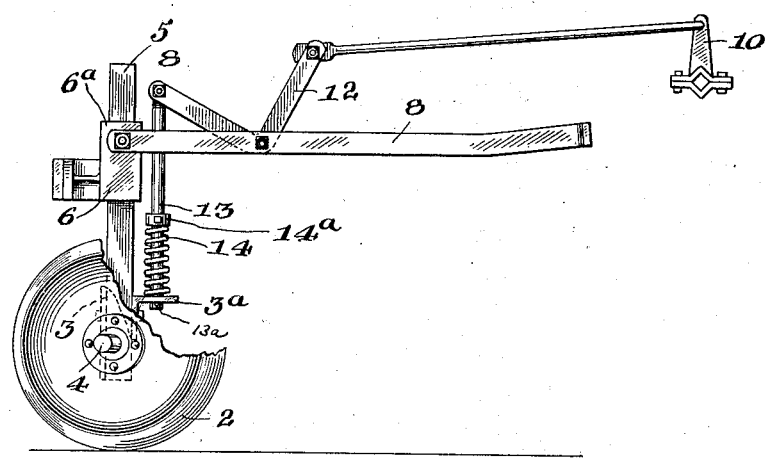
Fig. 4 shows the attachment in side elevation, separated from the lister, one of the guide wheels being partially broken away.

In the drawings, we show a two row lister previously invented by us, wherein a rigid main frame is carried by the two rear supporting or packer wheels $a$, and the two front supporting wheels $b$, with which the packer wheels $a$, track or are alined, respectively. The two front supporting wheels $b$, can be either castor or guiding wheels, and in the example illustrated, are shown of relatively small diameter, and as guiding as well as supporting wheels, for operative connection with and guiding control by a forwardly extending center laterally-swingable guiding tongue (not shown) although our invention is not so limited.

The rigid main frame, comprises the longitudinal rigid side sills $c$, at their rear portions mounted on and traversing the rear axle $a'$, of the packer wheels, and at their front ends fixed to the rigid front cross bar $d$, of the main frame.

The side sills $c$, are rigidly connected by the intermediate cross bar $e$, and stiffened by suitable bars secured to said cross bars and the sills to form diagonal braces, and in the example shown, diagonal braces are also secured to the side sills and the front cross bar *d*.

The driver's seat *f*, is shown in an elevated position above the rear portion of the implement and carried by the main frame through the medium of suitable seat supporting bars.

In the example shown, the two lister plows or so-called plow bottoms *g*, are arranged at opposite sides of the main frame between and aligned with the adjacent front and wheels *b*, *a*, respectively, and are provided with forwardly extending plow beams *g'*, respectively.

These plow beams at their front ends have suitable draft connections with the front corner portions of the main frame which are built out to provide rigid draft or clevis portions *h*, by which the draft is transmitted to the plow beams from the main frame through the medium of transverse pivots $g^2$, on which the plow beams are rockable vertically.

These transverse fulcrum or pivot pins $g^2$, are independently adjustable vertically through the medium of vertical bell cranks $g^3$, fulcrumed in said rigid corners *h*, and push and pull rods $q^4$, extending back to and actuated by hand levers $g^5$, carried by the main frame side sills, and each provided with a locking sector and hand controlled spring pressed pawl.

The two plow beams at their rear portions above the plow bottoms are connected by, and each beam is mounted to independently rock vertically on a cross shaft *j*, whereby the plow beams can be raised and lowered together and held at the desired vertical position. The plow beams can be independently rocked vertically on shaft *j*, to independently adjust the angle or level of each plow bottom, by manipulating the appropriate hand lever $q^5$, to raise or lower the front end of the beam.

The vertical positions of the plow beams and plow bottoms are determined and said beams are raised and lowered as one, by transverse rock shaft *k*, mounted in brackets fixed to the main frame side sills and having forwardly extending arms *k'*, fixed thereto with depending push and pull link connections $k^2$, to the cross shaft *j*. The rock shaft *k*, is provided with upstanding hand lever $k^3$, rigid therewith, for raising and depressing the plow bottoms, and a suitable sector and hand operated spring pressed pawl is provided for locking said hand lever and parts actuated thereby, in the desired positions.

In the example shown, castings *l*, are fixed in the inner angles of the front corners of the main frame and provide vertical bearings for the upstanding vertical spindles *b'*, which are rotatably mounted in said bearings. The horizontal axles for the front supporting wheels *b*, are rigid with and project laterally from the lower ends of said spindles, which spindles are provided with collars that uphold the front of the main frame.

In the particular example illustrated, the ridge splitter attachment, so called, with which the lister described, is equipped, embodies a pair of coacting frame supporting and guiding rotary wheels 2 preferably of the bell type, arranged at the front of the main frame midway between the two front main frame supporting wheels *b*, to travel on the soil at the bottom of the depression between and parallel with the two ridges on which supporting wheels *b*, travel. These two bell wheels or disks 2, are mounted and arranged to function (1) as main frame supporting wheels by travelling on the floor of the depression and cooperating with the wheels *b*, in upholding the front of the main frame to maintain the plow bottoms *g*, at the desired level and in resisting any tendency of the wheels *b*, to sink to an undue depth in the soil along the tops of the ridges, and (2) as guides by engaging the opposite side walls of the depression between the ridges to hold the implement to its straight forward path with front wheels *b*, travelling forward on and longitudinally of the ridges. To these ends, the two bell wheels are arranged with their convex sides facing outwardly and their concaved sides facing each other and with the wheels inclined to converge forwardly with respect to the direction of forward movement of the implement, a mounting or carriage for said two wheels being provided whereby the rotary wheels are fixedly held in their inclined or angular positions while free to rotate, and whereby the carriage for the wheels is held against substantial play or yielding movement forwardly and/or rearwardly with respect to the direction of forward movement of the implement, and whereby the carriage is held to an approximately straight-line vertical path of movement in following inequalities of the depression bottom and vertical adjustment to and from operative position.

In the particular example illustrated, the carriage for said bell wheels 2, consists of a strong frame, body or casting 3, having the two fixed axles 4, on which the wheels 2, are mounted to freely rotate, respectively, rigid therewith and diverging forwardly and projecting laterally in opposite directions from opposite sides or ends thereof. This frame 3, is also provided with an elongated central strong vertical slide or guide post 5, rigid therewith and upstanding therefrom midway between the two wheels 2. A relatively fixed elevated guide or holder is provided to which post 5, is adapted, for cooperation between the post and guide to permit straight line vertical movement of the carriage and its wheels 2, and to maintain and hold the carriage and its said wheels against objectionable forward and/or rearward movements. For instance, in the example shown, this holder or guide, consists of a strong frame or casting 6, formed to fit the central portion of the rigid front bar $d$, of the implement main frame, and to be rigidly, yet removably, secured thereto, as by bolts 7. This rigid strong frame 6, will then project rearwardly from said front main frame bar, centrally above the carriage for the bell wheels 2, and at its rear portion, said frame 6, is formed with the rigid strong vertical sleeve or hub $6^a$, integral or otherwise rigid therewith, slidably receiving and through which the upstanding post 5, of said carriage projects upwardly. The cross sectional formation of the bore of said hub corresponds to the preferably angular cross sectional formation of said post, to hold the post against turning in said bore or its longitudinal axis, and to permit free up and down sliding movement of the post in said bore.

A frame 6, and its vertical hub $6^a$, are preferably braced and strengthened by one or more bars 8, arranged longitudinally of the implement main frame and at their front ends secured to the hub $6^a$, as by screws or bolts $8^a$, and at their rear ends removably yet rigidly fixed to the main frame cross bar $e$, as by bolts $8^b$.

These bars 8, can also be utilized as a support or partial support for means provided to control and determine the vertical position of the bell wheels 2, and the carriage therefor.

Mechanism is provided for automatically raising and lowering the carriage and its bell wheels 2, from and to operative position, as the plow bottoms $g$, are correspondingly raised and lowered from and to operative position. For this purpose, as an example, we show an upright arm 10, removably fixed to the implement rock shaft $k$, that controls the vertical positions of the plow bottoms. A push and pull link 11, is at its rear end pivotally coupled to the free end of said arm 10, and at its front end this link is pivotally coupled to the upper or free end of the upstanding arm of a vertically swingable bell crank lever 12, mounted on a transverse fulcrum pin $12^a$, carried by bars 8. The forwardly projecting arm of this bell crank 12, is operatively coupled to the carriage 3, of the bell wheels, to raise and lower the same. For instance, a vertical elevating and depressing rod 13, is at its upper end pivotally joined to the free end of said forwardly projecting arm of said bell crank. This rod 13, depends behind the carriage post 5, and at its lower end passes down slidably through a vertical aperture in a strong arm $3^a$, rigid with and projecting rearwardly from said carriage 3, or its post 5. Below said arm $3^a$, the rod 13, is provided with a normally fixed rigid stop head $13^a$, to engage the under side of said arm to lift the carriage on the upward lifting movement of the rod 13. A more or less strong heavy coiled compression spring 14, is arranged on rod 13, above and bearing down on arm $3^a$, to yieldingly hold the arm down against stop head $13^a$ and permit vertical movements of the carriage in action. This spring is normally under tension between arm $3^a$, and an abutment sleeve $14^a$, on rod 13, and adjustable longitudinally thereof to vary the downward tension of the spring on the carriage carrying bell wheels 2.

When the hand lever $k^3$, is swung forward to depress the plow bottoms and then locked to hold the bottoms in depressed position, the arm 10, will be swung forwardly, to swing bell crank 12, to depress rod 13, and force down carriage 3, and guide and supporting wheels 2, which will then be locked in depressed position by the same means that lock the plows, except in so far that the tension spring 14, permits limited vertical movements of the wheels 2, and the carriage therefor, when in operative position following the inequalities of the soil and aiding in supporting the lister at the front.

Correspondingly, when the hand lever $k^3$, is swung rearwardly to elevate the plow bottoms, the wheels 2, and their carriage will also be elevated, as hereinbefore described, through the medium of rod 13, its head $13^a$, and the carriage arm $3^a$.

From the illustration and the foregoing explanations, the operation of the wheels 2, and their carriage and the controlling means therefor, in cooperation with the main frame, its supporting wheels, and plow bottoms during the ridge splitting action, will be apparent to those skilled in the art.

The two row lister illustrated is a planter, although to simplify the drawings and not confuse the ridge splitter showing, the seed boxes, seed tubes, boots and coverers, are not shown.

While the wheels 2, their carriage, and supports and controls, are usually made and sold as attachments for application to and removal from the listers as required yet we do not wish to so limit all features of our invention.

Also, while we have somewhat in detail, illustrated and explained our previously invented lister, and have shown the same equipped with our improved ridge splitter parts, yet we do not thereby wish to limit our present invention to such lister construction and arrangement or specific type.

It will be noted that the vertical rod 13, serves to depress the carriage through the medium of spring 14, and carriage arm $3^a$, and that said rod also serves to lift the carriage either through the medium of spring 14, by securing its lower end to carriage arm 3ª, or by the vertical abutment of rod head 13ª, with the under face of carriage arm 3ª.

The spring 14, is of sufficient power or strength to support and carry a considerable part of the weight of the front end of the lister, and hence when the lister thus equipped for ridge splitting is in action with the guide wheel carriage yieldingly held down in operative position under tension by spring 14, said spring will effectively aid wheels $b$, in upholding the machine front, through the medium of vertical rod 13, and bell crank 12, and its fulcrum 12ª, located at the front part of the machine, the bell crank then being locked by link 11, held against movement by hand lever $k^3$.

This spring tension, will also hold the guide wheels, located as they are under the front end of the lister, yieldingly down to operative position with respect to the floor or bottom of the trench, requiring said wheels to yield up and down relatively to rod 13, and the lister frame, and thus follow the inequalities of the soil while the wheels maintain their lister supporting contact with the soil, and while said wheels are guided in their approximate vertical straight line movement by the wheel carriage and suitable guiding means, such as post 5, and guideway 6ª.

The wheels 2, are of any suitable construction and formation to function as guide and supporting wheels, although we prefer to employ guide wheels of the bell type, i. e. embodying disks that close the wheels between their hubs and rims and are annularly flanged to form tapered or truncated-cone wheel rims, but do not wish to so restrict our invention.

No claim is herein made to the lister, apart from the ridge splitter, as claims to the lister are made in our patent application filed November 15, 1926, Serial No. 148,542 for improvements in agricultural implements.

We do not wish to limit our invention to the specific disclosure hereof except where required by the following claims construed in the light of the prior art, as various changes and modifications can be resorted to without departing from the spirit and scope of our invention.

What we claim is:—

1. Equipment for adapting a two row lister for ridge splitting, embodying lister supporting and guiding wheels, a carriage for said wheels and cooperating guiding and controlling mechanism whereby the carriage and its said wheels are held against movement forwardly and rearwardly and are held to straight line vertical movement to and from operative position.

2. For combination with a two row lister having a main frame with spaced front supporting wheels and vertically swingable plow bottoms, to adapt the lister for ridge splitting; a pair of guiding and supporting wheels for location between said front supporting wheels, a carriage for said pair of wheels having an upstanding guide post, guiding means for said post for securing to the lister main frame to permit straight line vertical movement of said carriage and its wheels, and means for raising and depressing said carriage.

3. In a ridge splitter, a lister, a carriage having a rigid upstanding guide to hold the carriage against forward and rearward movement and permit approximately straight-line vertical movement thereof; forwardly converging rotary bell wheels carried by said carriage for guiding the lister and to aid in upholding the front thereof; means carried by said lister to cooperate with said guide to hold the carriage to said vertical movement; spring means for yieldingly holding the carriage down to operative position; and means for raising and depressing the carriage with respect to the lister.

4. In combination, a main frame having spaced front supporting wheels and spaced rear supporting wheels; lister plow bottoms coupled to move forward with said frame and provided with means for raising and depressing the same, a carriage provided with frame guiding wheels arranged between said front supporting wheels; means cooperating with said carriage and the main frame for holding said carriage to straight-line vertical movement and whereby said guiding wheels will cooperate with said front wheels in upholding the frame front during ridge splitting; and means for raising and depressing said carriage.

5. A ridge splitting attachment for listers, embodying a vertical guideway to be fixed to the lister main frame; a vertically movable carriage provided with a pair of forwardly converging guide and main frame supporting wheels, said carriage having an upright portion rigid therewith for vertical sliding engagement with said guideway; and operative connections for raising and depressing the carriage and holding the same depressed including a tension spring to yieldingly hold the carriage down to follow the inequalities of the soil.

6. A ridge splitting attachment for rigid main frame two row listers; embodying a carriage having rigid oppositely extending forwardly diverging axles; forwardly converging ground wheels mounted on said fixed axles; means for securing to said main frame for vertically sliding contact with a rigid portion of said carriage to hold the carriage against substantial lateral movement and permit relative straight line vertical movement thereof; a vertical member for raising and depressing the carriage provided with a tension spring to yieldingly depress the carriage, and means for supporting and operating said vertical member, adapted for connection to and operation by the plow raising and depressing mechanism of the lister.

7. A ridge splitting attachment for rigid main frame two row listers; embodying a carriage having ground wheels; guide means adapted to be secured to said main frame for vertically sliding contact with a rigid portion of said carriage to hold the carriage against substantial lateral movement and permit relative straight-line vertical movement thereof; a vertical member for raising and depressing the carriage, a tension spring to yieldingly hold the carriage down to operative position, and means for supporting and operating said vertical member adapted for connection to and operation by the plow raising and depressing mechanism of the lister.

8. In a lister, the combination of a rigid main frame having supporting wheels and vertically movable plow beams having lister plows and a rock shaft coupled thereto for raising and depressing said plows; with a center front vertically movable carriage carrying guide wheels for use when ridge splitting, said carriage provided with a rigid upstanding portion; guiding means for said portion fixed to said main frame; brace means secured to the main frame and to said guiding means; a vertically swingable bell crank operatively connected to said rock shaft and actuated thereby; a vertical push and pull rod actuated by and depending from said bell crank and having vertical sliding operative engagement with said carriage, and a tension spring yieldingly holding the carriage down to operative position.

9. A ridge splitter attachment for listers, embodying forwardly converging bell ground wheels, a vertically-movable carriage providing the forwardly diverging axles for said wheels, means adapted to be secured to the lister frame for guiding the carriage on its vertical movement, with respect to said frame, and spring means for yieldingly holding the carriage down to operative position.

10. In a two row lister having a main frame with supporting wheels at its front corners; a pair of forwardly converging guide wheels arranged under the frame front and midway between said supporting wheels, a guide-wheel carriage providing forwardly diverging axles for said guide wheels, main frame upholding means depending from the main frame to said carriage providing for relative vertical movement of the carriage, and guiding and holding means between the carriage and main frame.

Signed at Beatrice, Nebraska, this 22nd day of January, 1929.

JAMES A. SMETHERS.
WILLIAM ELLIOTT.